Aug. 17, 1937.　　　　F. STREICH　　　　2,090,379
DOUGH TWISTING MACHINE
Filed Feb. 3, 1937　　　3 Sheets-Sheet 1
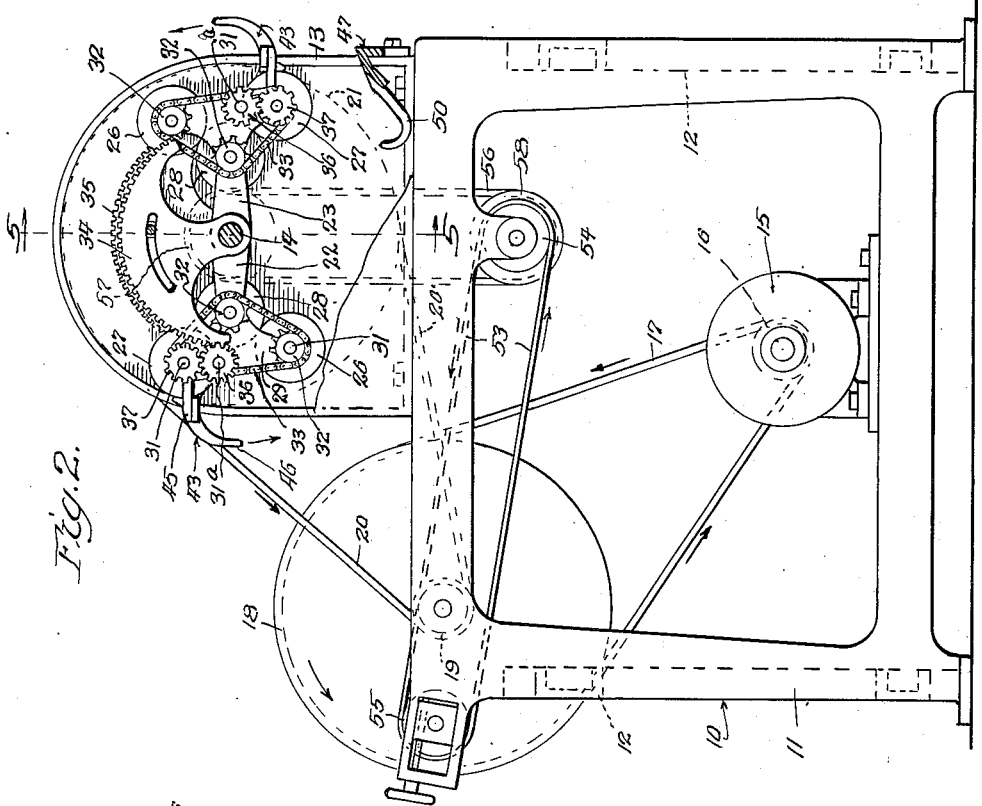
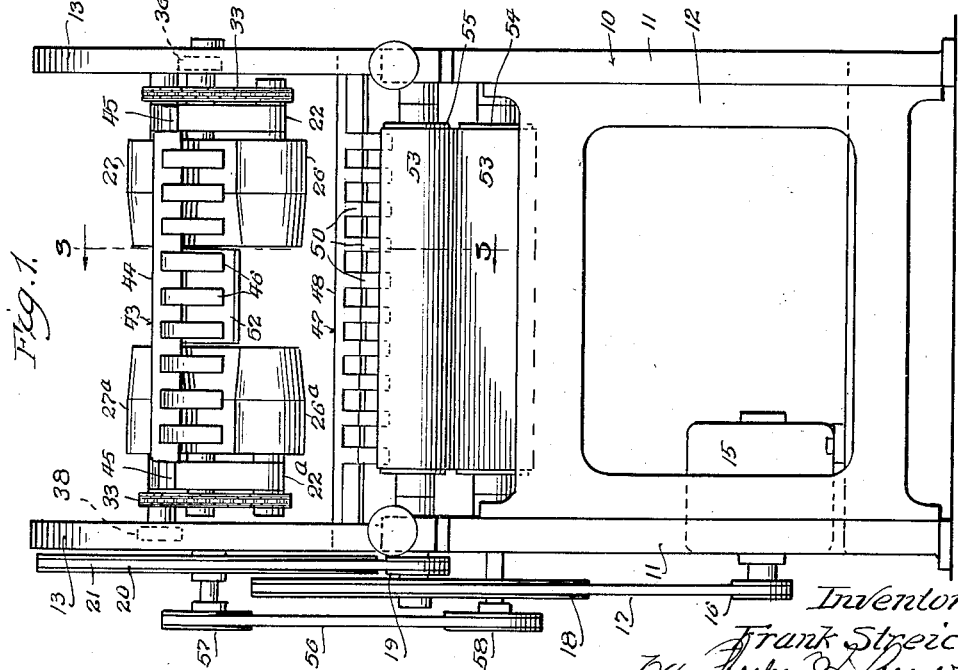
Inventor:
Frank Streich.

Aug. 17, 1937.   F. STREICH   2,090,379
DOUGH TWISTING MACHINE
Filed Feb. 3, 1937   3 Sheets-Sheet 2
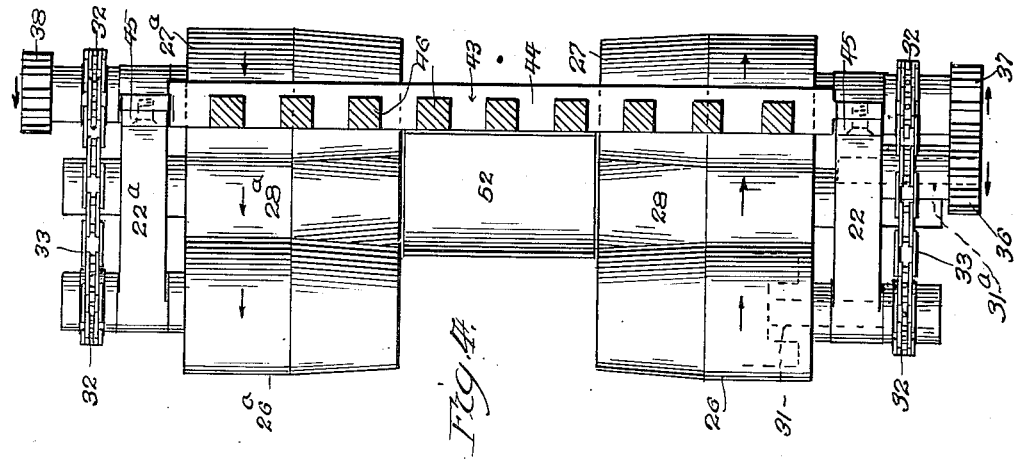
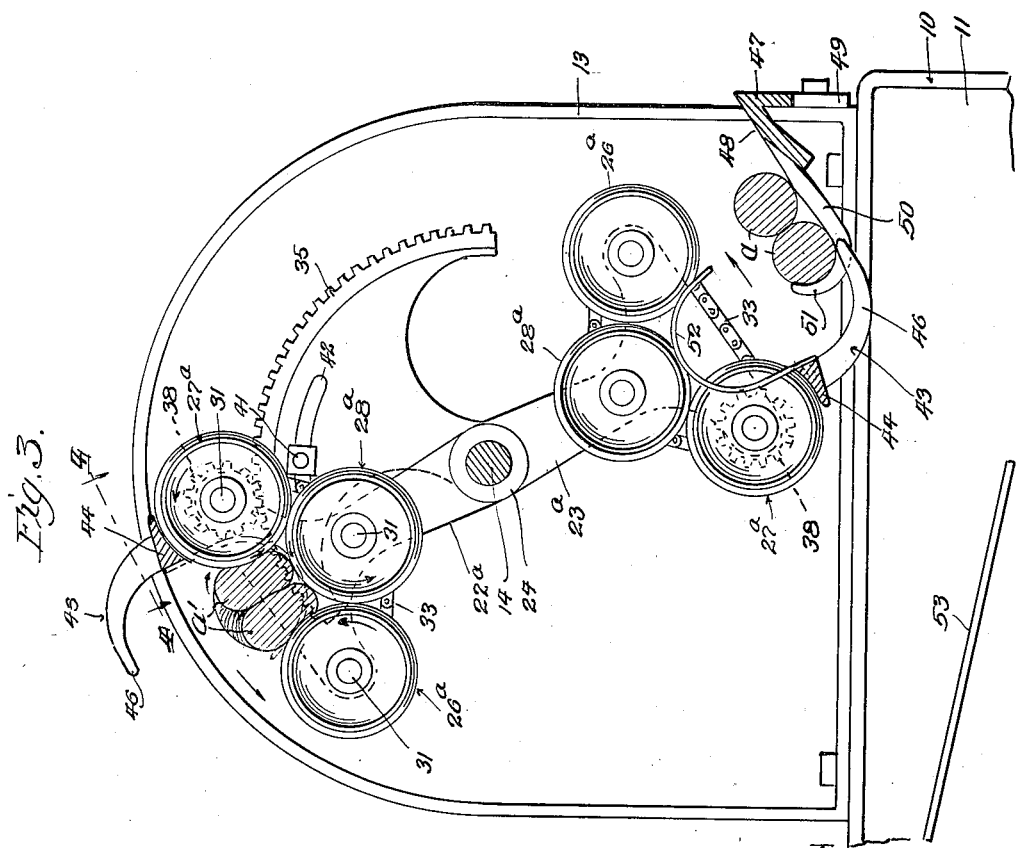
Inventor:
Frank Streich.
by Charles O. Shurvey
His Atty.

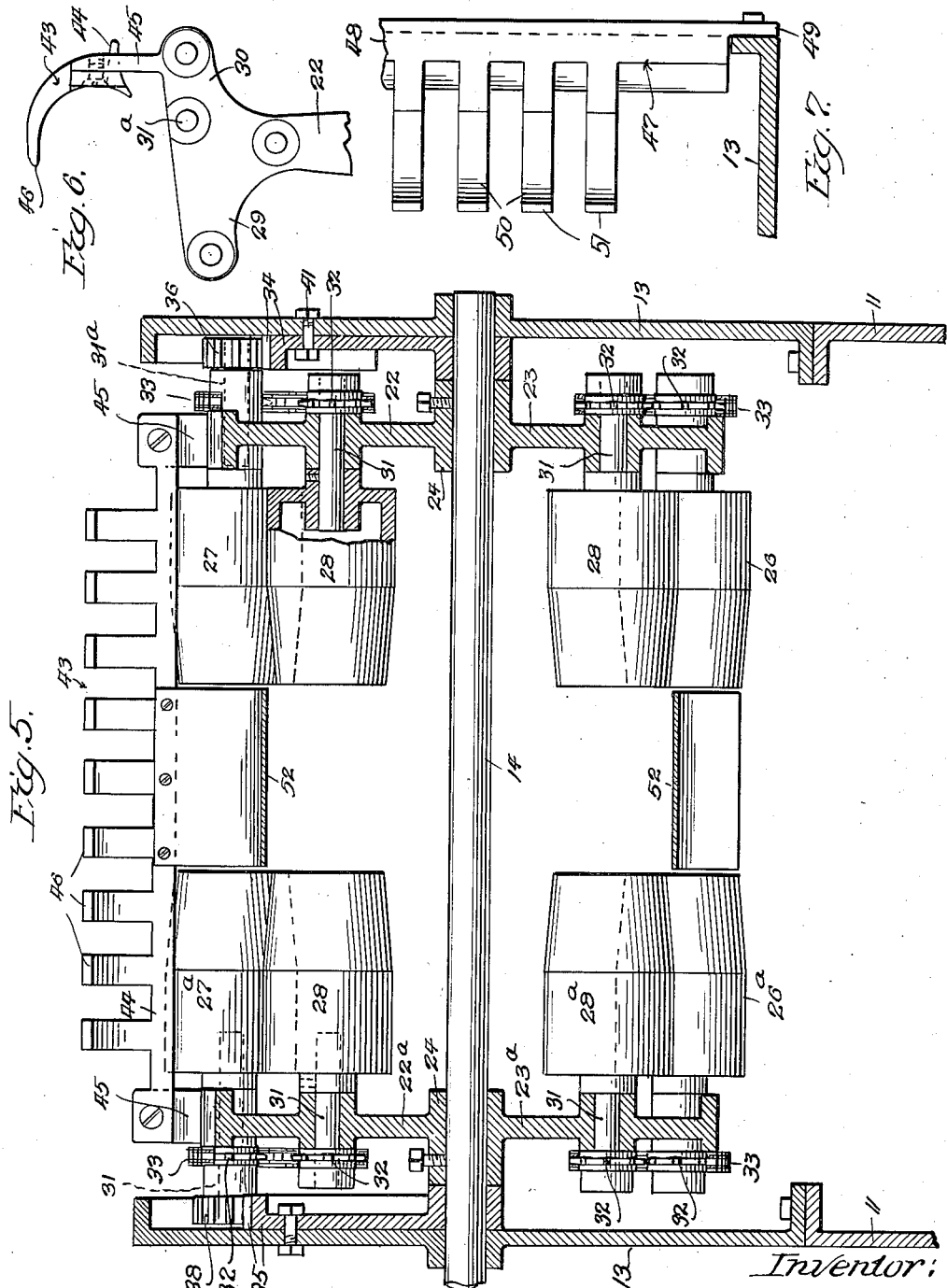

Patented Aug. 17, 1937

2,090,379

UNITED STATES PATENT OFFICE 2,090,379

DOUGH TWISTING MACHINE

Frank Streich, Chicago, Ill., assignor of one-third to Caleb H. Canby, Jr., and one-third to H. Hoyt Thompson, both of Chicago, Ill.

Application February 3, 1937, Serial No. 123,825

14 Claims. (Cl. 107—8)

This invention relates to dough twisting machines, and its principal object is to provide improved means for twisting together two or more rolls of dough preparatory to placing the twisted together rolls in a pan.

Heretofore rolls of dough have been manually twisted together before they are placed in the pans in the making of certain kinds of bread and other bakery goods. This operation takes considerable time and requires the services of one or more attendants to perform the twisting operations. Several attempts have been made to twist rolls of dough together by mechanical means, with more or less success, but since dough is a very plastic and more or less sticky substance, and because the rolls of dough vary in size to form various sizes of loaves of bread, prior efforts to mechanically twist together the rolls of dough have not met with much success.

One of the objects of the present invention is to provide dough twisting means, capable of successfully twisting together both large and small rolls of dough within given limits without the necessity of adjustment of any of the parts of the twisting mechanism. This I have accomplished with the use of two groups of oppositely disposed dough twisting rolls, arranged around a common center to form a trough to receive rolls of dough, together with means to rotate the rolls of one group in one direction and means to rotate the rolls of the other group in a direction opposite to the direction of rotation of the first mentioned group, whereby the rolls of dough are twisted together.

Another object of the invention is to provide a machine of simple and substantial construction, capable of handling the material rapidly and requiring a minimum amount of power to operate it.

With these and other objects and advantages in view, this invention consists in the several novel features hereinafter fully set forth and claimed.

The invention is clearly illustrated in the drawings accompanying this specification, in which:

Fig. 1 is an end elevation of a dough twisting machine, embodying a simple form of the present invention;

Fig. 2 is a side elevation thereof, with part of one of the side frames broken away, to illustrate mechanism that otherwise would be hidden from view;

Fig. 3 is a detail, vertical cross-section taken on the line 3—3 of Fig. 1, illustrating the dough twisting assemblies in a position in which one of them is about to pick up two rolls of dough;

Fig. 4 is a detail view of one of the dough twisting assemblies, partly in plan and partly in section, taken on the line 4—4 of Fig. 3;

Fig. 5 is a detail, vertical cross-section, taken on the line 5—5 of Fig. 2, but showing the dough twisting assemblies in a vertical position;

Fig. 6 is a detail, fragmental, side elevation of one of the arms which carries one set of dough twisting rolls; and Fig. 7 is a fragmental plan, partly in horizontal section, illustrating a certain dough detaining member.

Referring to said drawings, which are illustrative of one embodiment of the invention, the reference character 10 designates a rectangular supporting frame, composed of side frame members 11, connected at their ends by end frame members 12, bolted or otherwise fastened thereto. Bolted or otherwise secured to the upper ends of the side frame members, are upper side frame members 13, between which are mounted the dough twisting assemblies. The several frame members desirably are formed with flanges at their edges to provide added strength and rigidity.

Journaled in bearing bosses in the upper side frame members 13 is a shaft 14, driven from an electric motor or other power device 15, as by belts and pulleys 16, 17, 18, 19, 20 and 21. The arrangement shown provides drive mechanism for rotating the shaft 14 at a relatively low speed as compared with the speed of the motor.

Extending radially from the shaft 14 at places adjacent the upper side frame members 13, are arms 22, 22a, 23, 23a, which radiate from hubs 24 that are rigidly mounted upon the shaft. The arms 22, 22a are arranged in pairs and are disposed opposite to each other, as are also the arms 23, 23a and, in the embodiment of the invention shown, the arms 22, 23 are disposed diametrically opposite each other. As many pairs of arms may be employed as is found desirable. A dough twisting assembly is carried by each pair of arms 22, 22a and 23, 23a, and since the dough twisting mechanism carried by each pair of arms is substantially identical, I shall describe one twisting assembly, it being understood that such description applies to both twisting assemblies.

The oppositely disposed arms form carriers or rotatory supports for oppositely disposed twisting rolls 26, 27, 28 and 26a, 27a, 28a, three rolls for each set being shown, although a lesser or greater number may be employed if found desirable. The twisting rolls of one set extend toward the twisting rolls of the opposite set, corresponding rolls being arranged in co-axial alignment and desirably spaced apart from each other to leave a gap between the opposing sets of rolls. As a preference, the twisting rolls are made hollow for the sake of lightness and they taper slightly toward the middle of the machine. Desirably the twisting rolls are not smooth, but have their surfaces slightly roughened or they may be fluted or otherwise treated to obtain greater purchase upon the dough. The twisting rolls of each set are disposed about a common center to provide a trough between them in which the rolls of dough are received and twisted together. In order to support the twisting rolls of each set in this relation, the outer end of each arm is formed with lateral projections 29, 30 (see Fig. 6), which carry the rolls 26, 27 or 26a, 27a, the roll 28 or 28a, being carried by the main part of the arm.

Each twisting roll is rigidly mounted upon a stub shaft 31 journaled in a bearing boss formed on the arm, and each stub shaft has rigidly secured thereon a sprocket wheel 32, around which sprocket wheels is trained a sprocket chain 33. The sprocket wheels and sprocket chains provide one means whereby when the twisting roll 27 or 27a is rotated about its own axis, the other rolls of the set are rotated on their axes in the same direction. As a result, the adjacent faces of adjacent twisting rolls rotate in opposite directions and act to rotate the rolls of dough in the trough formed by the set of rolls, one roll acting to carry the dough down into the crotch between adjacent rolls, and the adjacent roll acting to carry the dough out of the crotch. The three dough twisting rolls of one set frictionally engage the dough and turn it around a common axis in one direction and the dough twisting rolls of the opposite set act to turn the dough around in the opposite direction, thereby twisting the two rolls of dough together from end to end.

Means are provided for reversely rotating the twisting rolls of the oppositely disposed sets during the twisting operation, and the means shown comprises stationary gear racks or segments 34, 35 and pinions 36, 37 for one set of twisting rolls, and a pinion 38 for the other set of twisting rolls. The pinion 36 is mounted on a stud shaft 31a, carried by the arm 22 and runs into and out of mesh with the gear segment 34. This pinion 36 also meshes with the intermediate pinion 37 which is rigidly mounted on the shaft 31 of the roll 27 and does not mesh with the gear segment 34. The pinion 38 is mounted on the shaft 31 for the roll 27a and runs into and out of mesh with the gear segment 35. With the use of an intermediate pinion 37 for one set of twisting rolls and a single pinion 38 for the opposite set, reverse rotation of the twisting rolls of the opposite sets is obtained during the time the pinions 36, 38 are in mesh with the gear segments and rolling along the same.

Conveniently the gear segments 34, 35 are located adjacent the inner faces of the upper side frame members 13 and the teeth thereof are concentric with the shaft 14, whereby the pinions 36, 38, may run into and out of mesh with the gear segments during a part of each cycle of rotation of the arms. The gear segments may be rotatively and adjustably mounted on the shaft 14 to enable the gear segments to be adjusted angularly about the axis of the shaft so as to control the beginning and end of the cycles of rotation of the dough twisting rolls. The adjustability of the gear segments enables one set of dough twisting rolls to commence and finish the twisting action before the opposite set, and this has been found desirable. The gear segments are held stationary by bolts 41 held in the upper frame members, and extending through slots 42 in the gear segments. The latter are adjusted by turning them upon the shaft 14. When adjusted to place they are fastened to the upper frame members by the bolts 41.

It is to be understood that the shaft 14 rotates the arms 22, 22a, 23, 23a and therewith bodily rotates the dough twisting rolls through a circular orbit and that when the pinions 36, 38 run into mesh with the gear segments, the dough twisting rolls are then rotated about their own axes, the rolls of the oppositely disposed sets being reversely rotated.

The gear segment 34 is slightly less in diameter than the gear segment 35. The purpose of this is to enable the intermediate pinion 37 to pass freely over the gear segment 34, while permitting the driving pinion 36 to mesh with the gear segment.

Ordinarily the rolls of dough are delivered to the machine one at a time from a molding machine, and the timing is such that when two rolls of dough or any other required number are received by the machine, one of the dough twisting assemblies is approaching the place where it receives the rolls of dough. Sometimes more than the required number of rolls of dough are delivered to the machine before a twisting assembly arrives at the place where it receives the rolls of dough and means have been provided to enable each twisting assembly to pick up the required number of rolls of dough at a time, although more than the required number may have been delivered to the machine. The means for accomplishing this will now be described.

Mounted on and extending between each pair of arms 22, 22a and 23, 23a is a toothed scoop 43 which picks up the rolls of dough delivered to the machine and delivers them to the two associated sets of twisting rolls. The scoop 43 may be in the form of a bar 44, formed with teeth 46 and secured to posts or lugs 45 formed upon the extensions 30 of the arms 22, 22a or 23, 23a, the teeth 46 extending from one side of the bar 44 and being curved or arched over the trough between the rolls and extending in the direction of rotation in the dough twisting assembly.

The end of the machine which receives the rolls of dough from the molder may be termed the "receiving station" and at said end is a dough detaining member 47, upon which the rolls of dough are delivered, one at a time, from the molder. Desirably the dough detaining member may be in the form of an inclined crosswise extending bar 48, located between the upper side frame members and having downturned lugs 49 bolted to the edges of said frame members. From the bar 48, inclined fingers 50 extend downwardly therefrom and terminate in upwardly curved extremities 51 which prevent the rolls of dough from rolling off the fingers. The spaces between the fingers 50 are aligned with the tongues 46, of the scoop 43, and permit said tongues to pass along the side edges of said fingers and pick up the required number of rolls of dough from said fingers. This is more clearly illustrated in Fig. 3, where the tongues of one twisting assembly are about to pass by the fingers. The width of the scoop is such that two rolls of dough can be accommodated in it, but if a third roll of dough has been accidentally delivered to the machine it will be rolled away by the scoop and will be picked up by the scoop of the other twisting assembly. Consequently only the required number of rolls of dough will be picked up by each scoop.

The two sets of dough twisting rolls of each assembly are spaced apart and to prevent the dough from sagging between the two sets of twisting rolls, a short trough 52 is provided between the two sets of twisting rolls. The trough desirably is composed of a piece of sheet metal, bent up in the form of a channel or trough, one end being screwed or otherwise fastened to the bar 44 of the toothed scoop. The trough 52 also serves to support the twisted rolls of dough until the twisting assembly approaches the end of its down movement.

Conveniently an endless belt 53 is provided for conveying forward the twisted rolls of dough that are discharged from the twisting mechanism. The belt 53 is trained over rollers 54, 55, one of which is adjustably mounted on the frame. The roller 54 may be driven by suitable means from some slowly rotating element of the machine, and said means is here shown to comprise a belt 56 trained around pulleys 57, 58, one mounted on the shaft 14 and one on the shaft of the roller 54. The place where the twisting assemblies discharge the twisted together rolls of dough may be termed the "discharge station". The belt carries the twisted rolls of dough to the end of the machine opposite the receiving station and an attendant picks up the twisted rolls of dough from the belt and places them in the pan.

In the operation of the machine, the rolls of dough (a) Fig. 3, discharged from the molder, roll down the detaining member 47, one after the other, and are detained by the fingers thereof in position to be picked up by the toothed scoop of that twisting assembly which is approaching the receiving station.

The shaft 14 rotates the arms 22, 22$^a$, 23, 23$^a$, thereby bodily rotating the dough twisting rolls in a circular orbit passing the receiving and discharge stations. As a scoop of a twisting assembly passes the detaining member 47, it picks up two rolls of dough, and as this twisting assembly continues to rotate and the scoop assumes a more nearly vertical position, the two rolls of dough fall into the trough between the associated twisting rolls, and as the pinions 36, 38 run into mesh with the gear segments and roll along the same, they reversely rotate the opposite twisting rolls of the twisting assembly, and as a result the two rolls of dough are twisted together, as at $a^1$ in Fig. 3. When the pinions have run off the gear segments the twisting operation ceases, and as the twisting assembly moves downward to a position where the trough between the twisting rolls is inverted, the twisted rolls of dough fall therefrom by gravity and drop upon the conveyor belt, by which they are conveyed to the end of the machine to be picked up by an attendant and placed in pans.

With the use of rolls for performing the twisting operation, the machine is capable of operating on large or small rolls of dough within given limits without the necessity for adjustment of any of the parts of the twisting assemblies. Furthermore, the dough twisting rolls act more effectively on the rolls of dough to twist them about each other. The machine is simple in construction, is composed of a minimum number of parts and is not likely to get out of order.

More or less variation of the exact details of construction is possible without departing from the spirit of this invention. I desire, therefore, not to limit myself to the exact form of the construction shown and described, but intend, in the following claims to point out all of the invention disclosed herein.

I claim as new and desire to secure by Letters Patent:

1. A dough twisting machine, comprising in combination oppositely disposed dough twisting elements, oppositely disposed rotatory arms carrying said dough twisting elements, means for rotating said arms and therewith bodily moving said dough twisting elements through an orbit, and means for rotating said oppositely disposed dough twisting elements in opposite directions.

2. A dough twisting machine, comprising in combination oppositely disposed sets of dough twisting rolls, the rolls of one set being aligned with those of the other set, and the rolls of each set being arranged to form a trough, means to deliver a plurality of rolls of dough to the troughs, carriers to bodily move said twisting rolls through an orbit, means to rotate the rolls of one set upon their axes in one direction, and means to rotate the rolls of the other set upon their axes in a direction opposite to the direction of rotation of the first mentioned set of rolls.

3. A dough twisting machine, comprising in combination oppositely disposed sets of dough twisting rolls, the several rolls of one set being aligned with the several rolls of the other set, and the rolls of each set being arranged to form a trough, means to deliver a plurality of rolls of dough to the troughs, oppositely disposed arms forming the supports for the rolls, means to rotate said arms in unison and therewith bodily rotate the dough twisting rolls through a circular orbit, means to rotate the rolls of one set upon their axes in one direction, and means to rotate the rolls of the other set in a direction opposite to the direction of rotation to the first mentioned set of rolls.

4. A dough twisting machine, comprising in combination oppositely disposed sets of dough twisting rolls, the several rolls of one set being aligned with the several rolls of the other set, and the rolls of each set being arranged to form a trough, means to deliver a plurality of rolls of dough to the trough, oppositely disposed arms forming the supports for the rolls, means to rotate said arms in unison and therewith bodily rotate the rolls through a circular orbit, stationary gear segments and gearing between said gear segments and the two sets of dough twisting rolls arranged to oppositely rotate the two sets of dough twisting rolls.

5. A dough twisting machine, comprising in combination a frame having a receiving station and a discharge station, two sets of oppositely disposed rotatory dough twisting rolls, the rolls of each set being disposed around a common center to form a trough, a movable carrier for each set of rolls, means for moving the carriers and therewith bodily rotating the dough twisting rolls through an orbit passing through the receiving and discharge stations, means for rotating the rolls of one set upon their axes in one direction, and means for rotating the rolls of the other set upon their axes in a direction opposite to the direction of rotation of the first mentioned set, said roll rotating means being arranged to rotate the rolls when traveling between the receiving and discharge stations.

6. A dough twisting machine, comprising in combination a frame, having a receiving station and a discharge station, two sets of oppositely disposed rotatory dough twisting rolls, the rolls of each set being disposed around a common center to form a trough, an arm for each set of rolls, a rotatory shaft upon which the arms are rigidly mounted, said shaft operating to rotate the arms and therewith bodily rotate the rolls past the receiving and discharge stations, means for rotating the rolls of one set upon their axes in one direction, means for rotating the rolls of the other set upon their axes in a direction opposite to the direction of rotation of the first mentioned set, said roll rotating means being arranged to rotate the rolls while traveling between the receiving and discharge stations.

7. A dough twisting machine, comprising in combination a frame having a receiving station and a discharge station, two sets of oppositely disposed rotatory dough twisting rolls, the rolls of each set being disposed around a common center to form a trough, a rotatable carrier for each set of rolls, means for moving the carriers and therewith bodily moving the rolls through an orbit passing through the receiving and discharge stations, gear segments stationarily supported on the frame, drive pinions, one for each set of rolls, adapted to run into and out of mesh with one of the gear segments, one of said drive pinions being rigid with one of the rolls of one set, and there being an intermediate pinion rigidly connected to one of the rolls of the other set and intermeshing with the drive pinion therefor, and gearing between the several rolls of each set, whereby the rolls of each set rotate in one and the same direction.

8. A dough twisting machine, comprising in combination oppositely disposed sets of tapered dough twisting rolls, the rolls of one set being aligned with those of the other set, with the tapered ends adjacent each other, means for bodily rotating the rolls, and means to rotate the two sets of rolls in opposite directions.

9. A dough twisting machine, comprising in combination a frame having receiving and discharge stations, oppositely disposed sets of dough twisting rolls, oppositely disposed arms carrying said rolls, means to rotate said arms and therewith bodily rotate the rolls, means to rotate the two sets of rolls in opposite directions, a dough detaining member at the receiving station, and a scoop carried by said arms and arranged to pick up rolls of dough detained by the dough detaining member.

10. In a dough twisting machine, the combination of a frame, having a slotted dough detaining member, oppositely disposed sets of dough twisting rolls, carriers upon which said rolls are mounted, means for rotating said carriers, means for rotating the rolls of each set in a direction opposite to the direction of rotation of the rolls of the other set, and a slotted scoop mounted on said carriers and arranged to pick up the rolls of dough detained by the detaining member.

11. In a dough twisting machine, the combination of a pair of oppositely disposed arms, a rotatory shaft upon which said arms are mounted, two sets of dough twisting rolls, one set mounted upon each arm, the rolls of each set being disposed about a common center to form a trough, and the two sets of rolls being spaced apart to leave a gap therebetween, a trough carried by said arms, and located between the two sets of rolls, and means to rotate the two sets of rolls in opposite directions.

12. In a dough twisting machine, the combination of a frame having a receiving station and a discharge station, a dough detaining member mounted at the receiving station and being formed with fingers having upturned extremities, a pair of oppositely disposed arms, sets of dough twisting rolls carried by said arms, means to rotate the sets of rolls in opposite directions, a scoop mounted upon said arms and having curved tongues arranged to pass through the spaces between fingers of the dough detaining member and pick up the required number of rolls of dough detained thereby.

13. In a dough twisting machine, the combination of a frame, having oppositely disposed upper side frame members, a shaft journaled in said frame members, carriers mounted on said shaft, dough twisting assemblies mounted on said carriers, each assembly having a pinion for rotating a member of the assembly, and gear segments adjustably mounted on said shaft and adapted to intermesh with said pinions.

14. In a dough twisting machine, the combination of oppositely disposed carriers, dough twisting assemblies mounted thereon and comprising dough twisting rolls, means for rotating the carriers and therewith bodily rotating the dough twisting assemblies, and gearing for rotating the rolls of the assemblies, one set in one direction and one set in the opposite direction.

FRANK STREICH.